(12) United States Patent
Lee et al.

(10) Patent No.: US 11,289,033 B2
(45) Date of Patent: Mar. 29, 2022

(54) DISPLAY DEVICE WITH SWITCHABLE VIEWING ANGLES

(71) Applicant: Infovision Optoelectronics (Kunshan) Co., LTD., Suzhou (CN)

(72) Inventors: Hung-Ming Lee, Suzhou (CN); Hsin-Chieh Lai, Suzhou (CN); Pei-Yang Lin, Suzhou (CN); Chunyun Wu, Suzhou (CN)

(73) Assignee: INFOVISION OPTOELECTRONICS (KUNSHAN) CO., LTD., Suzhou (CN)

( * ) Notice: Subject to any disclaimer, the term of this patent is extended or adjusted under 35 U.S.C. 154(b) by 0 days.

(21) Appl. No.: 17/042,784

(22) PCT Filed: Feb. 12, 2019

(86) PCT No.: PCT/CN2019/074883
§ 371 (c)(1),
(2) Date: Sep. 28, 2020

(87) PCT Pub. No.: WO2020/062751
PCT Pub. Date: Apr. 2, 2020

(65) Prior Publication Data
US 2021/0020115 A1 Jan. 21, 2021

(30) Foreign Application Priority Data
Sep. 27, 2018 (CN) .......................... 201821584554.0

(51) Int. Cl.
*G09G 3/20* (2006.01)
*G09G 3/34* (2006.01)
(Continued)

(52) U.S. Cl.
CPC ........... *G09G 3/342* (2013.01); *F21V 23/003* (2013.01); *F21V 23/04* (2013.01); *G02B 6/0068* (2013.01);
(Continued)

(58) Field of Classification Search
CPC ........... G09G 3/342; G09G 2310/0275; G09G 2310/08; G09G 2320/028;
(Continued)

(56) References Cited

U.S. PATENT DOCUMENTS

2007/0279376 A1* 12/2007 Park ..................... G09G 3/3413
345/102
2011/0249039 A1* 10/2011 Ogi ...................... G09G 3/3426
345/690

(Continued)

FOREIGN PATENT DOCUMENTS

CN 103197426 A 7/2013
CN 105549146 A 5/2016
(Continued)

*Primary Examiner* — Abdul-Samad A Adediran
(74) *Attorney, Agent, or Firm* — Cheng-Ju Chiang

(57) ABSTRACT

A display device with switchable viewing angle includes a display panel, a backlight source, a timing controller, a source driver chip and an LED driver module. The backlight source includes a plurality of LEDs. The timing controller is connected to the source driver chip. The source driver chip is connected to the plurality of data lines. The LED driver module is connected to the plurality of LEDs. The display panel has a narrow viewing angle mode and a wide viewing angle mode. In the narrow viewing angle mode, the luminous brightness of the plurality of LEDs is adjusted to gradually decrease from the middle to both sides of the display panel. In the wide viewing angle mode, the luminous brightness of the plurality of LED is adjusted to gradually increase from the middle to both sides of the display panel.

9 Claims, 14 Drawing Sheets

(51) Int. Cl.
*F21V 23/00* (2015.01)
*F21V 23/04* (2006.01)
*F21V 8/00* (2006.01)
*F21Y 103/33* (2016.01)
*F21Y 103/10* (2016.01)
*F21Y 115/10* (2016.01)

(52) U.S. Cl.
CPC ......... *G02B 6/0073* (2013.01); *G09G 3/2092* (2013.01); *F21Y 2103/10* (2016.08); *F21Y 2103/33* (2016.08); *F21Y 2115/10* (2016.08); *G09G 2310/0275* (2013.01); *G09G 2310/08* (2013.01); *G09G 2320/028* (2013.01); *G09G 2320/0606* (2013.01); *G09G 2320/068* (2013.01); *G09G 2320/0626* (2013.01); *G09G 2320/0686* (2013.01); *G09G 2354/00* (2013.01); *G09G 2358/00* (2013.01)

(58) Field of Classification Search
CPC ..... G09G 2320/0606; G09G 2320/068; G09G 2320/0686; G09G 2354/00; G09G 2358/00; G09G 3/3413; G09G 3/3426; F21V 23/003; F21V 23/04; F21Y 2103/33; F21Y 2103/10; F21Y 2115/10; G02B 6/0068; G02B 6/0073; G02B 3/005; G02F 1/133603; G02F 1/13306; H04N 1/00169

USPC .................................. 345/102, 690; 349/61
See application file for complete search history.

(56) References Cited

U.S. PATENT DOCUMENTS

| | | | |
|---|---|---|---|
| 2012/0044438 A1* | 2/2012 | Cao | G02F 1/133603 349/61 |
| 2016/0078819 A1 | 3/2016 | Park et al. | |
| 2016/0316074 A1* | 10/2016 | Chae | H04N 1/00169 |
| 2017/0263208 A1* | 9/2017 | Imai | G09G 3/342 |
| 2018/0122292 A1* | 5/2018 | Ju | G02B 3/005 |
| 2019/0101806 A1* | 4/2019 | Takaya | G02F 1/13306 |

FOREIGN PATENT DOCUMENTS

| | | |
|---|---|---|
| CN | 106205506 A | 12/2016 |
| CN | 107255873 A | 10/2017 |
| CN | 206657157 U | 11/2017 |
| CN | 107561772 A | 1/2018 |
| CN | 107945745 A | 4/2018 |
| CN | 207249301 U | 4/2018 |
| JP | 2013-235205 A | 11/2013 |
| JP | 2014-71426 A | 4/2014 |
| TW | 201317958 A1 | 5/2013 |
| WO | 2011/104949 A1 | 9/2011 |

* cited by examiner

DISPLAY DEVICE WITH SWITCHABLE VIEWING ANGLES

CROSS REFERENCE TO RELATED APPLICATIONS

This application is a 35 U.S.C. § 371 National Phase conversion of International (PCT) Patent Application No. PCT/CN2019/074883, filed on Feb. 12, 2019, which claims the priority of Chinese Patent Application No. 201821584554.0, filed on Sep. 27, 2018. The contents of the above-identified applications are incorporated herein by reference. The PCT International Patent Application was filed and published in Chinese.

FIELD OF THE INVENTION

The present invention relates to the field of display technology, and more particularly to a display device with switchable viewing angles.

BACKGROUND OF THE INVENTION

Nowadays, people are paying more and more attention to protecting their privacy, and there are many things that they don't like to share with others. In public places, people always hope that his/her content is kept confidential when watching a mobile phone or browsing a computer. Therefore, the display device with a single viewing angle mode has been unable to meet the needs of users, and the display device is gradually developing towards the direction that the viewing angle can be switched. In addition to a wide viewing angle mode, the display device may be switched to a narrow viewing angle mode in some occasions when anti-peeping is needed.

With the progress of society, people's requirements for the display device with switchable viewing angle are no longer limited to the protection of personal privacy, but also have higher requirements for the display effect of picture in a narrow viewing angle mode. At present, when the display device is switched to the narrow viewing angle mode, a whitening phenomenon will be seen from the side of the display device, which cannot meet the needs of the users for display effect at a dark state in the narrow viewing angle mode.

SUMMARY OF THE INVENTION

In view of the above shortcomings, an object of the present invention is to provide a display device with switchable viewing angle to enhance the anti-peeping effect in the narrow viewing angle mode and avoid the whitening phenomenon at large viewing angles.

An embodiment of the present invention provides a display device with switchable viewing angles, which includes a display panel, a backlight source, a timing controller, a source driver chip and an LED driver module. The display panel is provided with a plurality of scanning lines and a plurality of data lines. The plurality of scanning lines and the plurality of data lines are insulated and intersected with each other to define a plurality of pixel units arranged in an array. The backlight source includes a plurality of LEDs. The timing controller is connected to the source driver chip. The source driver chip is connected to the plurality of data lines. The LED driver module is connected to the plurality of LEDs. The display panel has a narrow viewing angle mode and a wide viewing angle mode. In the narrow viewing angle mode, the luminous brightness of the plurality of LEDs is adjusted to gradually decrease from the middle to both sides of the display panel. In the wide viewing angle mode, the luminous brightness of the plurality of LED is adjusted to gradually increase from the middle to both sides of the display panel.

In an embodiment, in the narrow viewing angle mode, the pixel brightness of the display panel is also adjusted to gradually decrease from the middle to both sides of the display panel; in the wide viewing angle mode, the pixel brightness of the display panel is also adjusted to gradually increase from the middle to both sides of the display panel.

In an embodiment, in the narrow viewing angle mode, the brightness distribution of the plurality of LEDs is in an inverted V-shape or in a parabolic shape with an opening facing downward; in the wide viewing angle mode, the brightness distribution of the plurality of LEDs is in a V-shape or in a parabolic shape with the opening facing upward.

In an embodiment, the backlight source further includes a light bar and a light guide plate. The light guide plate is located under the display panel. The light bar is disposed adjacent to a side surface of the light guide plate. The plurality of LEDs are arranged on the light bar along an axial direction of the light bar, and the plurality of LEDs are divided into a plurality of zones in the axial direction of the light bar to realize control by zones.

In an embodiment, the plurality of LEDs are divided into 2n zones arranged in order in the axial direction of the light bar, wherein n is an integer greater than 1. The $1^{st}$ zone is located at one end of the light bar, the $2n^{th}$ zone is located at the other end of the light bar, and the rest zones are arranged in order between the $1^{st}$ zone and the $2n^{th}$ zone.

In an embodiment, in the 2n zones, the $x^{th}$ zone and the $(2n-x+1)^{th}$ zone are connected in series and connected to the same feedback node, wherein x is an integer greater than or equal to 1 and less than n.

In an embodiment, the light bar is located at the bottom or the top of the display panel.

In an embodiment, the minimum luminous brightness of the plurality of LEDs in the wide viewing angle mode is greater than or equal to the maximum luminous brightness of the plurality of LEDs in the narrow viewing angle mode.

In an embodiment, the display panel further has a highlight display mode, and in the highlight display mode, the luminous brightness of the plurality of LEDs is uniform from the middle to both sides of the display panel. The luminous brightness of the plurality of LEDs in the highlight display mode is greater than or equal to the maximum luminous brightness of the plurality of LEDs in the wide viewing angle mode.

An embodiment of the present invention also provides a display device with switchable viewing angles, which includes a display panel, a backlight source, a timing controller, a source driver chip, and an LED driver module. The display panel is provided with a plurality of scanning lines and a plurality of data lines. The plurality of scanning lines and the plurality of data lines are insulated and intersected with each other to define a plurality of pixel units arranged in an array. The backlight source includes a plurality of LEDs. The timing controller is connected to the source driver chip. The source driver chip is connected to the plurality of data lines. The LED driver module is connected to the plurality of LEDs. The display panel has a narrow viewing angle mode and a wide viewing angle mode; in the narrow viewing angle mode, the luminous brightness of the plurality of LEDs is adjusted to gradually decrease from the center to the periphery of the display panel.

In an embodiment, in the narrow viewing angle mode, the pixel brightness of the display panel is also adjusted to gradually decrease from the center to the periphery of the display panel.

In an embodiment, the backlight source further includes a substrate. The substrate is located under the display panel. The plurality of LEDs are arranged on the substrate in an array, and the plurality of LEDs are divided into a plurality of zones on the substrate to realize control by zones.

In an embodiment, the plurality of LEDs are divided into n zones arranged annularly and concentrically on the substrate, wherein n is an integer greater than 1.

In an embodiment, in the wide viewing angle mode, the plurality of LEDs have the same luminous brightness from the center to the periphery of the display panel.

In an embodiment, the display device further includes a viewing angle switching button for user operation to generate a viewing angle switching signal. The viewing angle switching signal is transmitted to the timing controller and the LED driver module.

The display device provided in this embodiment can switch between a narrow viewing angle mode and a wide viewing angle mode. In the narrow viewing angle mode, the luminous brightness of the plurality of LEDs is adjusted to gradually decrease from the middle to both sides of the display panel, to effectively improve the narrow viewing angle display effect in the X direction (i.e., the left-to-right direction), and avoiding the whitening phenomenon at large viewing angles. In the wide viewing angle mode, the luminous brightness of the plurality of LEDs is adjusted to gradually increase from the middle to both sides of the display panel, to improve the situation that the luminous brightness of both sides of the concentrating backlight is low and improve the display effect in the wide viewing angle mode. Therefore, the display device can adopt different display modes according to different usage scenarios of the user, and ensure that the display in each mode achieves a better effect.

DETAILED DESCRIPTION OF PREFERRED EMBODIMENTS

In order to make the objects, technical solutions and advantages of the present invention much clear, embodiments of the present invention will be further described with reference to the accompanying drawings.

First Embodiment

Figure 1:
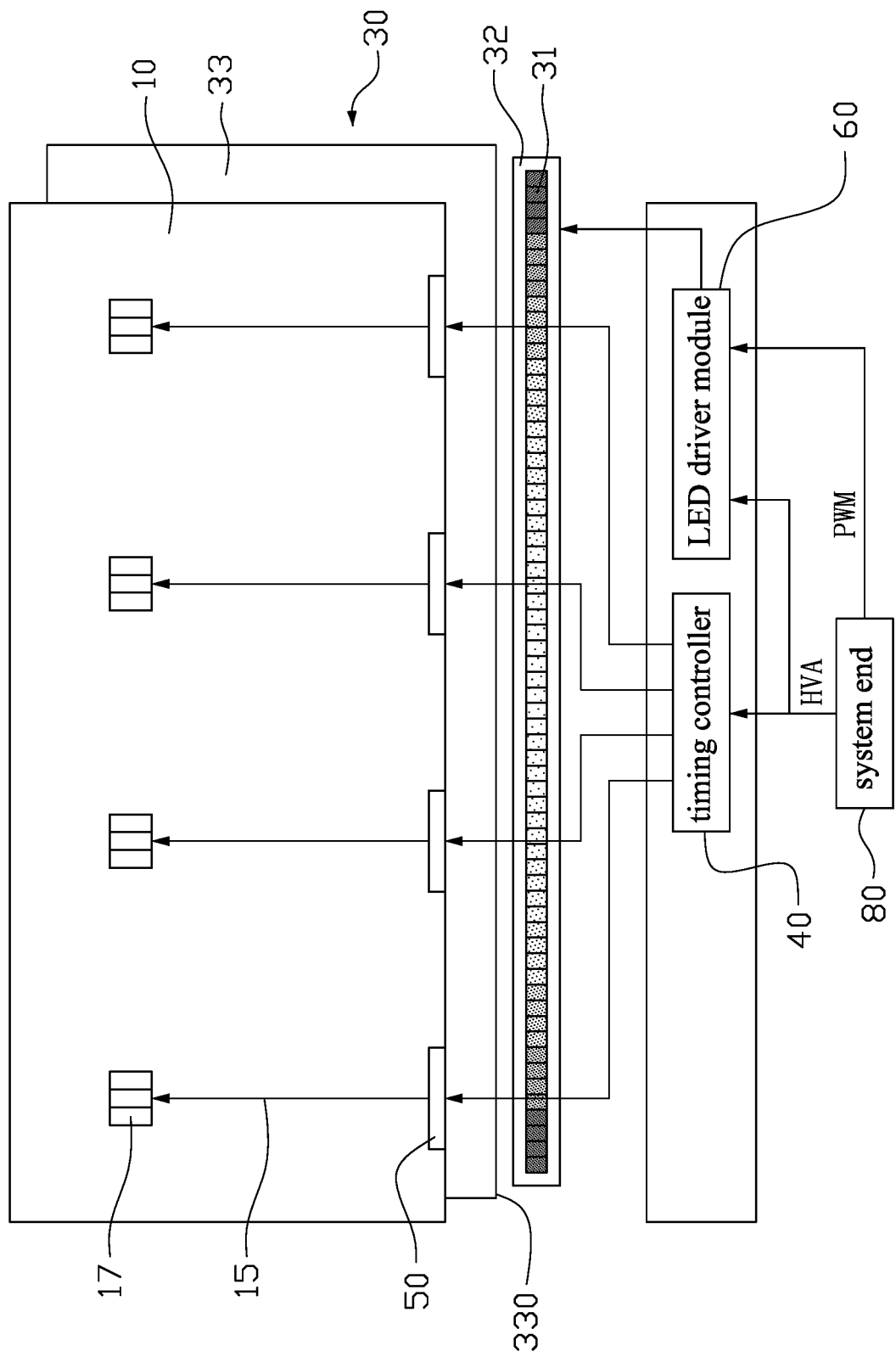
FIG. 1 is a schematic block diagram of a display device in a first embodiment of the present invention.

FIG. 1 is a schematic block diagram of a display device in a first embodiment of the present invention. Referring to FIG. 1, the display device provided in this embodiment includes a display panel 10, a backlight source 30, a timing controller 40, a source driver chip 50, and an LED driver module 60.

Figure 7:
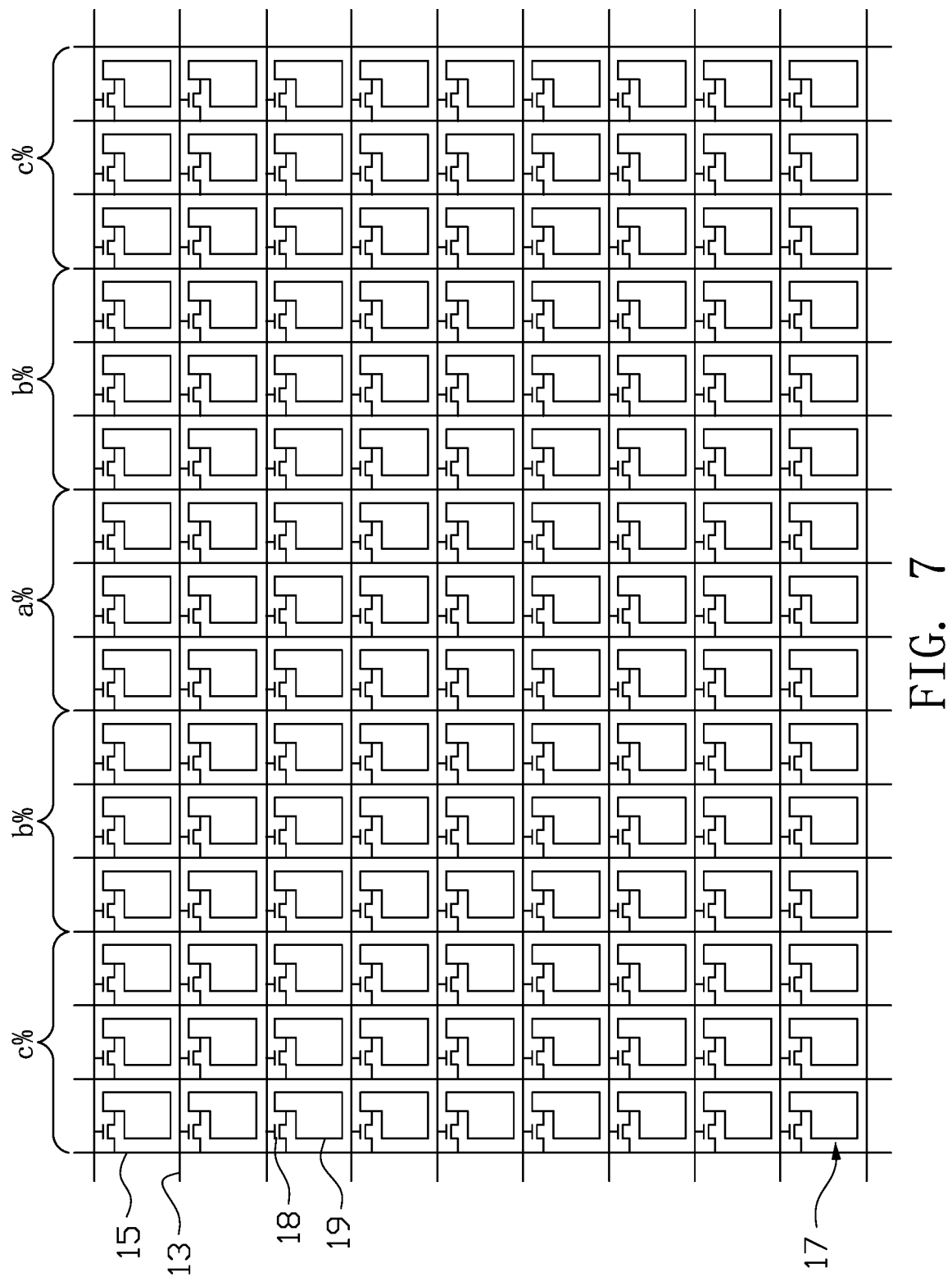
FIG. 7 is a schematic diagram of a brightness distribution of the pixels of the display panel of FIG. 1 in the narrow viewing angle mode.

Referring to FIG. 1 and FIG. 7, the display panel 10 is provided with a plurality of scanning lines 13 and a plurality of data lines 15. The plurality of scanning lines 13 and the plurality of data lines 15 are insulated and intersected with each other to define a plurality of pixel units 17 arranged in an array. Each pixel unit 17 is provided with a switching element 18 and a pixel electrode 19. The pixel electrode 19 is connected to the scanning line 13 and the data line 15 through the switching element 18.

Referring to FIG. 1, the timing controller 40 is connected to the source driver chip 50, and the source driver chip 50 is connected to the plurality of data lines 15. The number of the source driver chip 50 may be one or more, which is shown as multiple in the figures. The timing controller 40 is connected to the multiple source driver chips 50, and each source driver chip 50 is connected to a part of the data lines 15. The timing controller 40 applies data signals to the plurality of pixel units 17 through the multiple source driver chips 50, so that the display panel 10 realizes display of pictures.

The backlight source 30 includes a plurality of LEDs (light-emitting diode) 31, and the LED driver module 60 is connected to the plurality of LEDs 31. In this embodiment, the backlight source 30 further includes a light bar 32 and a light guide plate 33. The light guide plate 33 is located under the display panel 10, and the light bar 32 is disposed adjacent to a side surface 330 of the light guide plate 33, that is, the backlight source 30 is a side type backlight structure. The plurality of LEDs 31 are arranged on the light bar 32 along an axial direction of the light bar 32. In this embodiment, the light bar 32 is located at the bottom of the display panel 10, but it is not limited thereto. In other embodiments, the light bar 32 may also be located at the top of the display panel 10.

The display panel 10 can switch between a narrow viewing angle mode and a wide viewing angle mode. Under normal circumstances, the display panel 10 may be in the wide viewing angle mode. In an occasion requiring anti-peeping, the display panel 10 may be switched to the narrow viewing angle mode in order to protect personal privacy. For example, when the viewing angle needs to be switched, the user can send a viewing angle switching signal HVA to the display device. The high and low levels of the viewing angle switching signal HVA correspond to the narrow viewing angle mode and the wide viewing angle mode respectively; when the viewing angle switching signal HVA is at low level, the display panel 10 is switched to the wide viewing angle mode; and when the viewing angle switching signal HVA is at high level, the display panel 10 is switched to the narrow viewing angle mode.

Figure 2:
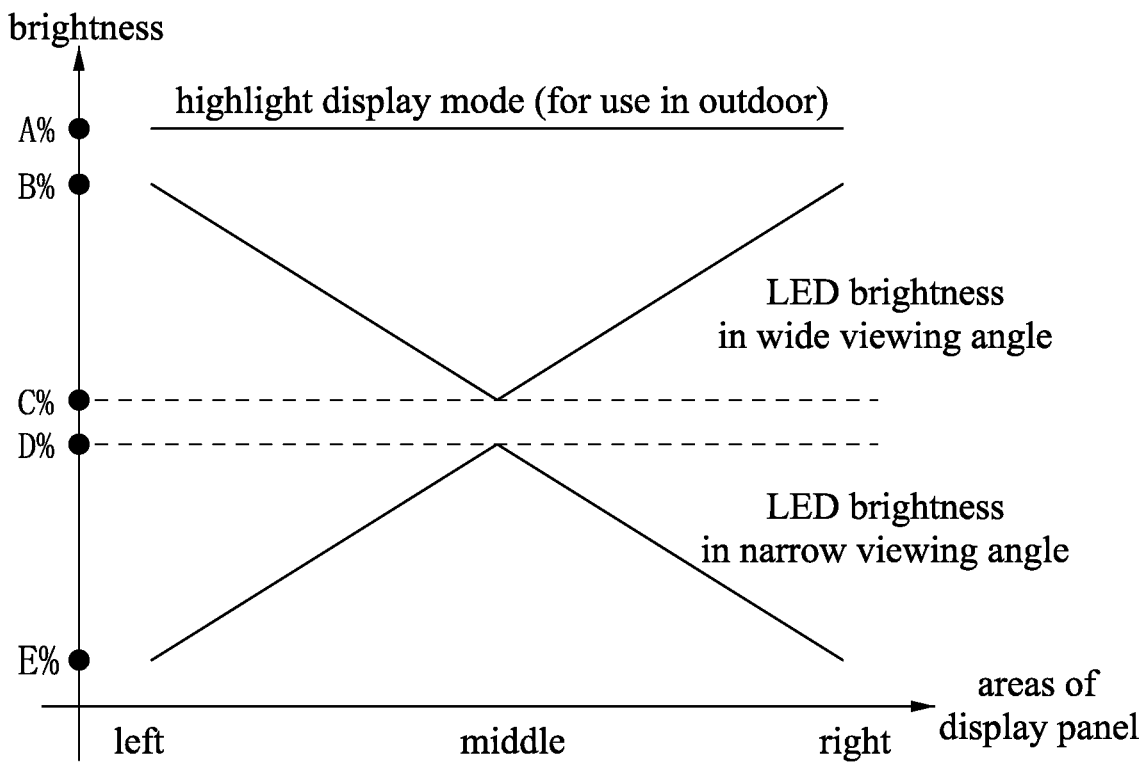
FIG. 2 is a schematic diagram of a brightness distribution of the backlight source of FIG. 1 in different viewing angle modes.

FIG. 2 is a schematic diagram of a brightness distribution of the backlight source 30 of FIG. 1 in different viewing angle modes. Referring to FIG. 2, in the narrow viewing angle mode, the luminous brightness of the plurality of LEDs 31 is adjusted to gradually decrease from the middle of the display panel 10 to both sides (i.e., the middle is bright and the both sides are dark). The backlight brightness on the left and right sides of the display panel 10 is reduced, and the brightness is low when the viewing angle is greater than 45°, so that the display panel 10 can achieve a narrow viewing angle display effect along the left-to-right direction.

In order to enhance the narrow viewing angle effect, the backlight source 30 may use a concentrating backlight source, that is, a light concentrating sheet (not shown) may be provided between the light guide plate 33 and the display panel 10, and the backlight emitted by the light bar 32 is concentrated after passing through the light guide plate 33 and the light concentrating sheet, that is, the backlight brightness is high in the middle, and the backlight brightness on both sides is slightly lower, so as to enhance the effect of narrow viewing angle.

In this embodiment, in the narrow viewing angle mode, the luminous brightness of the plurality of LEDs 31 gradually decreases from the middle to both sides of the display panel 10, and the brightness distribution is in an inverted V-shape. When used with a concentrating backlight source, it can enhance the anti-peeping effect. FIG. 2 shows that in the narrow viewing angle mode, the luminous brightness of the plurality of LEDs 31 gradually decreases from D % brightness in the middle to E % brightness on both sides.

The use of a concentrating backlight source can enhance the dark state display effect in the narrow viewing angle mode, but the concentrating backlight source may also reduce the display effect of the display device in the wide viewing angle mode. Referring to FIG. 2, further, in the wide viewing angle mode, the luminous brightness of the plurality of LEDs 31 is adjusted to gradually increase from the middle of the display panel 10 to both sides (i.e., the middle is dark and the both sides are bright), to compensate for the situation that the backlight brightness of the concentrating backlight source is bright in the middle and slightly lower on both sides, and improve the display effect of the concentrating backlight source in the wide viewing angle mode.

In this embodiment, in the wide viewing angle mode, the luminous brightness of the plurality of LEDs 31 gradually increases from the middle of the display panel 10 to both sides, and the brightness distribution is in a V-shape. When used with a concentrating backlight source, it can improve the low brightness on both sides of the concentrating backlight source and improve the display effect in the wide viewing angle mode. FIG. 2 shows that in the wide viewing angle mode, the luminous brightness of the plurality of LEDs 31 gradually increases from C % brightness in the middle to B % brightness on both sides.

In addition, when the display device is used in an environment with relatively strong outdoor lighting, in order to enhance the visibility of the picture, the display panel 10 can also be switched from the narrow viewing angle mode or the wide viewing angle mode to a highlight display mode at this time. In the highlight display mode, the luminous brightness of the plurality of LEDs 31 is uniform from the middle to both sides of the display panel 10, and has the maximum brightness (i.e., A % brightness).

In this embodiment, the brightness distribution in various usage modes is: A %>B %>C %>D %>E %. That is, the luminous brightness (i.e., A % brightness) of the plurality of LEDs 31 in the highlight display mode is greater than the maximum luminous brightness (i.e., B % brightness) of the plurality of LEDs 31 in the wide viewing angle mode. The minimum luminous brightness (i.e., C % brightness) of the plurality of LEDs 31 in the wide viewing angle mode is greater than the maximum luminous brightness (i.e., D % brightness) of the plurality of LEDs 31 in the narrow viewing angle mode. However, it can be understood that the present invention is not limited thereto. For example, the luminous brightness of the plurality of LEDs 31 in the highlight display mode may be equal to the maximum luminous brightness of the plurality of LEDs 31 in the wide viewing angle mode, and the minimum luminous brightness of the plurality of LEDs 31 in the wide viewing angle mode may be equal to the maximum luminous brightness of the plurality of LEDs 31 in the narrow viewing angle mode.

Figure 3:
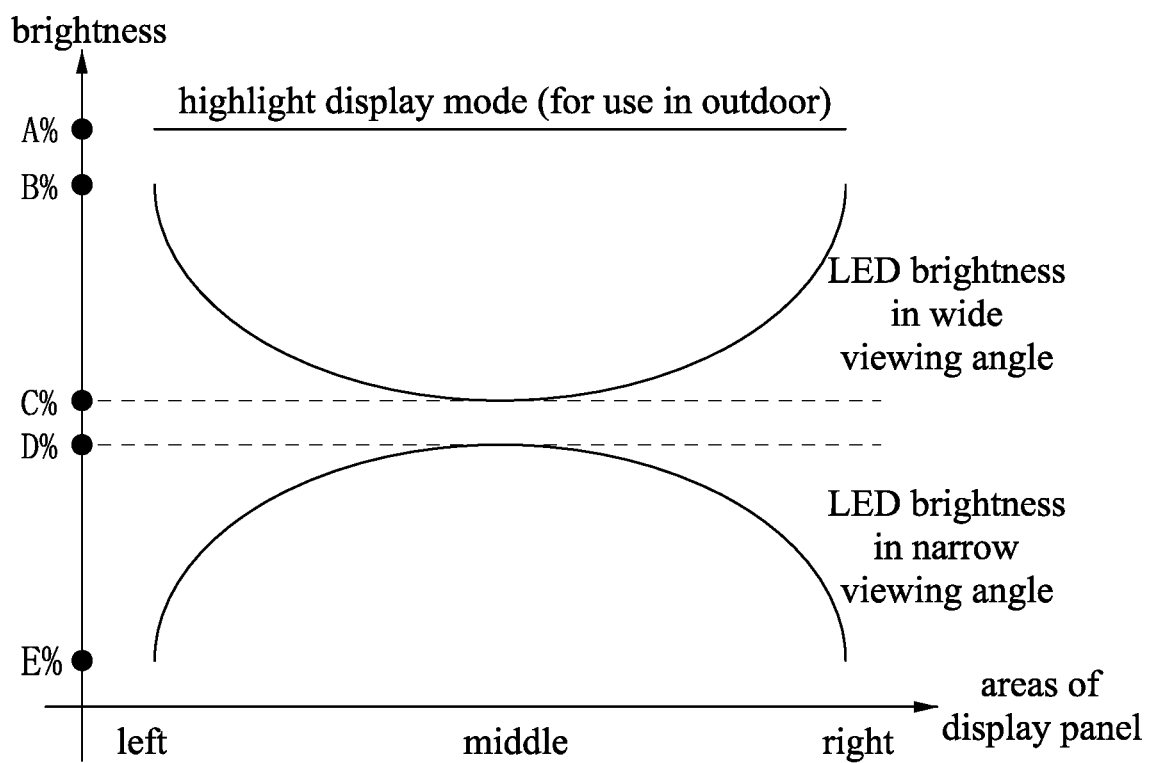
FIG. 3 is another schematic diagram of a brightness distribution of the backlight source of FIG. 1 in different viewing angle modes.

FIG. 3 is another schematic diagram of a brightness distribution of the backlight source 30 of FIG. 1 in different viewing angle modes. Referring to FIG. 3, in the narrow viewing angle mode, the brightness distribution of the plurality of LEDs 31 from the middle to both sides of the display panel 10 may also be in a parabolic shape with an opening facing downward or other shapes, as long as the luminous brightness of the plurality of LEDs 31 gradually decreases from the middle to both sides of the display panel 10. In the wide viewing angle mode, the brightness distribution of the plurality of LEDs 31 from the middle to both sides of the display panel 10 may also be in a parabolic shape with an opening facing upward or other shapes, as long as the luminous brightness of the plurality of LEDs 31 gradually increases from the middle to both sides of the display panel 10.

Figure 4:
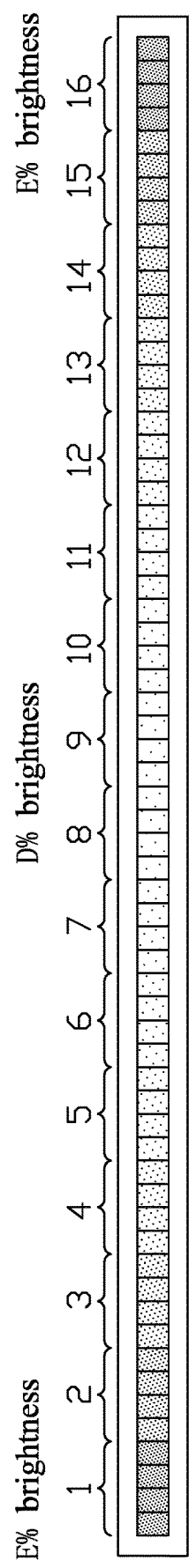
FIG. 4 is a schematic diagram of a brightness distribution of various LEDs on the light bar of the backlight source of FIG. 1 in the narrow viewing angle mode.

FIG. 4 is a schematic diagram of a brightness distribution of various LEDs on the light bar of the backlight source of FIG. 1 in the narrow viewing angle mode. In the narrow viewing angle mode, the luminous brightness of the plurality of LEDs 31 gradually decreases from the middle to both sides, for example, in FIG. 4, it is illustrated that the luminous brightness of the plurality of LEDs 31 gradually decreases from D % brightness in the middle to E % brightness on both sides.

Figure 5:
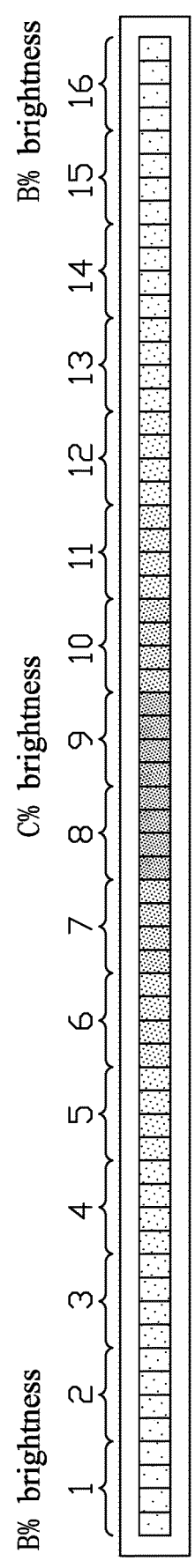
FIG. 5 is a schematic diagram of a brightness distribution of the various LEDs on the light bar of the backlight source of FIG. 1 in the wide viewing angle mode.

FIG. 5 is a schematic diagram of a brightness distribution of the various LEDs on the light bar of the backlight source of FIG. 1 in the wide viewing angle mode. In the wide viewing angle mode, the luminous brightness of the plurality of LEDs 31 gradually increases from the middle to both sides, for example, in FIG. 5, it is illustrated that the luminous brightness of the plurality of LEDs 31 gradually increases from C % brightness in the middle to B % brightness on both sides.

Referring to FIG. 4 and FIG. 5, in this embodiment, the plurality of LEDs 31 are divided into a plurality of zones in the axial direction of the light bar 32 to realize control by zones. For example, the plurality of LEDs 31 are divided into 2n zones arranged in order in the axial direction of the light bar 32, wherein n is an integer greater than 1. Taking n=8 for example, that is, the plurality of LEDs 31 are divided into 16 zones arranged in order in the axial direction of the light bar 32, wherein the $1^{st}$ zone is located at the leftmost end of the light bar 32, the $16^{th}$ zone is located at the rightmost end of the light bar 32, and the rest zones are arranged in order between the $1^{st}$ zone and the $16^{th}$ zone. The number of LEDs 31 in each zone is not limited, and can be selected according to actual need. In this embodiment, taking four LEDs 31 in each zone as an example, a total of 64 LEDs 31 are distributed along the light bar 32.

Figure 6:
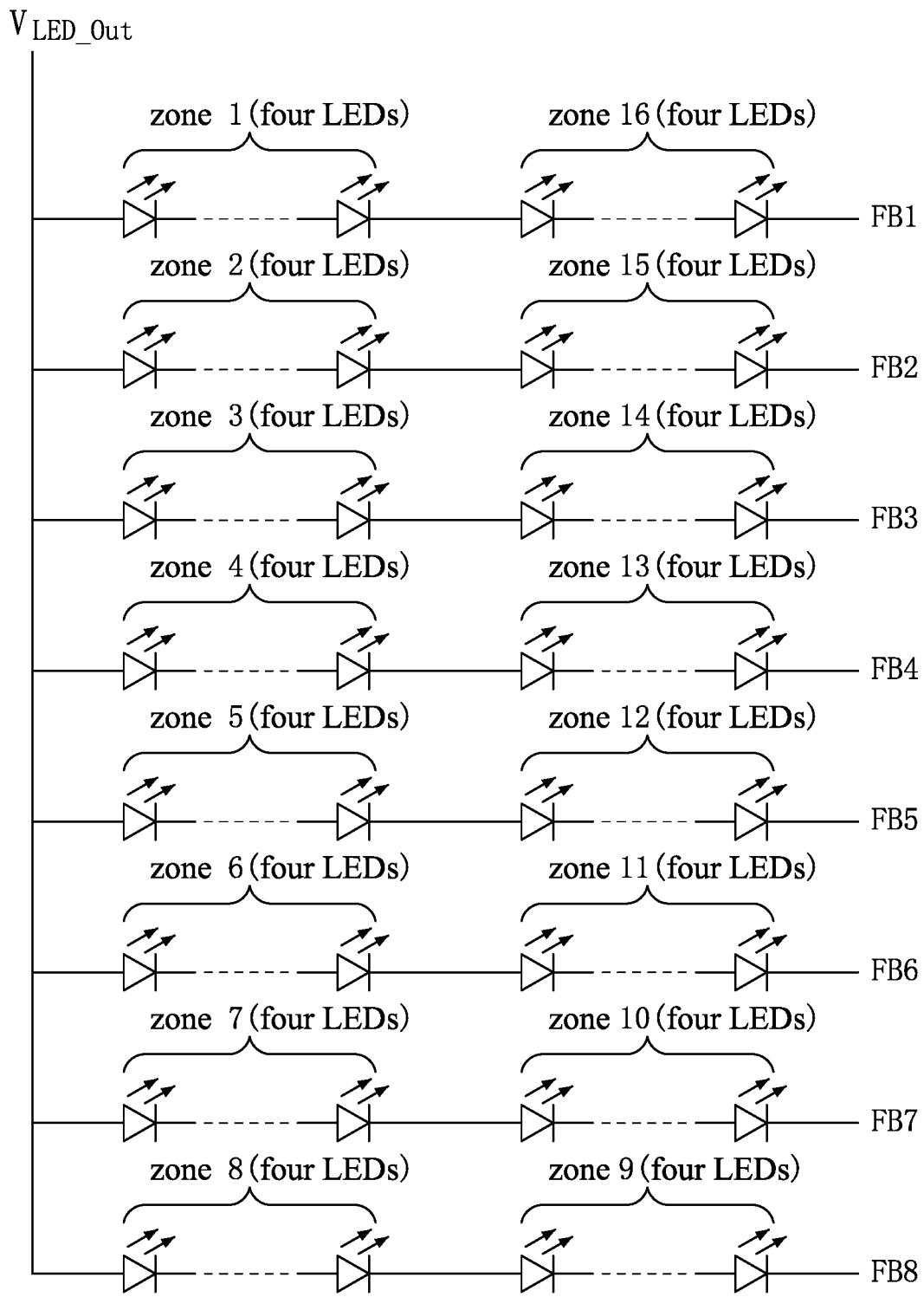
FIG. 6 is a schematic diagram of a serial-parallel connection of the various LEDs on the light bar of the backlight source of FIG. 1.

The connection method of the plurality of LEDs 31 can be selected to connect to one feedback node (FB) for each zone, or optionally, two symmetrical zones can be selected to connect to the same feedback node. In this embodiment, taking two symmetrical zones connected to the same feedback node as an example, that is, the $x^{th}$ zone and the $(2n-x+1)^{th}$ zone are connected in series, wherein x is an integer greater than or equal to 1 and less than n. Specifically, referring to FIG. 6, the $1^{st}$ zone and the $16^{th}$ zone are connected in series and connected to the same feedback node (i.e., FB1) of an LED driver circuit; in the same way, the $2^{nd}$ zone and the $15^{th}$ zone, the $3^{rd}$ zone and the $14^{th}$ zone, the $4^{th}$ zone and the $13^{th}$ zone, the $5^{th}$ zone and the $12^{th}$ zone, the $6^{th}$ zone and the $11^{th}$ zone, the $7^{th}$ zone and the $10^{th}$ zone, the $8^{th}$ zone and the $9^{th}$ zone are also connected in series every two and connected to another feedback node (i.e., FB2-FB8) of the LED driver circuit, so that the plurality of LEDs 31 can be independently controlled by zones.

FIG. 7 is a schematic diagram of a brightness distribution of the pixels of the display panel of FIG. 1 in the narrow viewing angle mode. Referring to FIG. 7, further, in the narrow viewing angle mode, the pixel brightness of the display panel 10 is also adjusted to gradually decrease from the middle to both sides of the display panel 10. That is, if each pixel unit 17 on the display panel 10 displays the same gray level, the brightness of pixels on both sides of the display panel 10 is less than the brightness of pixels in the middle of the display panel 10, so that in the narrow viewing angle mode, the luminous brightness of the plurality of LEDs 31 and the pixel brightness of the display panel 10 both decrease from the middle to both sides of the display panel 10, to further improve the anti-peeping effect in the narrow viewing angle mode. As shown in FIG. 7, the brightness of pixels at different areas of the display panel 10 is: a %>b %>c %, that is, the pixel brightness of the display panel 10 gradually decreases from the middle to both sides of the display panel 10.

Figure 8:
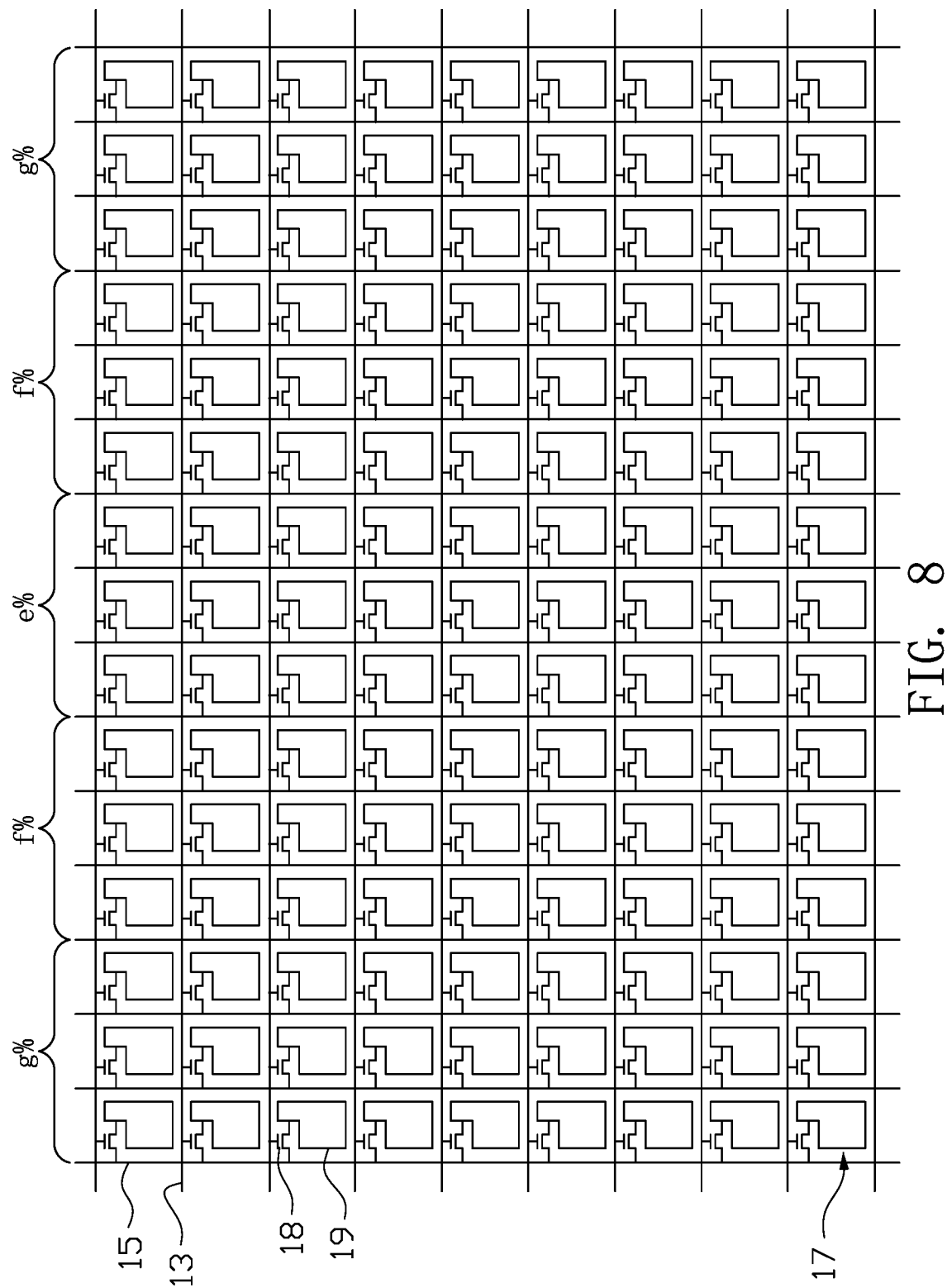
FIG. 8 is a schematic diagram of a brightness distribution of the pixels of the display panel of FIG. 1 in the wide viewing angle mode.

FIG. 8 is a schematic diagram of a brightness distribution of the pixels of the display panel of FIG. 1 in the wide viewing angle mode. Referring to FIG. 8, further, in the wide viewing angle mode, the pixel brightness of the display panel 10 is also adjusted to gradually increase from the middle to both sides of the display panel 10. That is, if each pixel unit 17 on the display panel 10 displays the same gray scale, the brightness of pixels on both sides of the display panel 10 is greater than the brightness of pixels in the middle of the display panel 10, so that in the wide viewing angle mode, the luminous brightness of the plurality of LEDs 31 and the pixel brightness of the display panel 10 both increase from the middle to both sides of the display panel 10, to further improve the display effect in the wide viewing angle mode. As shown in FIG. 8, the brightness of pixels at different areas of the display panel 10 is: e %<f %<g %, that is, the pixel brightness of the display panel 10 gradually increases from the middle to both sides of the display panel 10.

Figure 9:
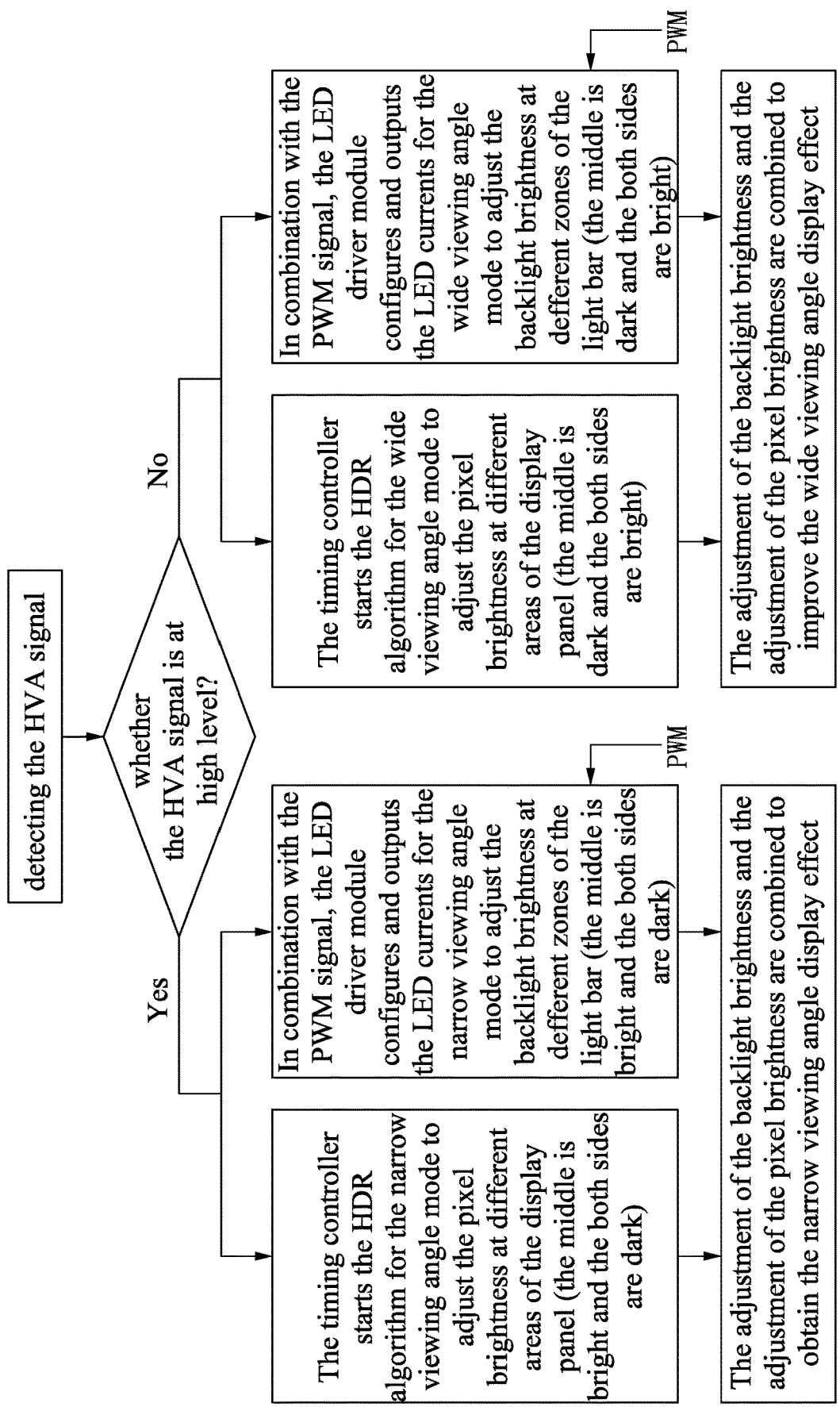
FIG. 9 is a driving flowchart of the display device of FIG. 1.

FIG. 9 is a driving flowchart of the display device of FIG. 1. Referring to FIG. 1 and FIG. 9, the driving method of the display device is as follows:

After receiving the viewing angle switching signal HVA sent by the user, the system end 80 transmits the viewing angle switching signal HVA to the timing controller 40 and the LED driver module 60 respectively, for controlling the switching between wide and narrow viewing angles. At the same time, the system end 80 also sends the data signals to be displayed to the timing controller 40, and the timing controller 40 applies the data signals to the plurality of pixel units 17 through the plurality of source driver chips 50, so that the display panel 10 realizes the display of pictures.

When switching to the narrow viewing angle mode, the LED driver module 60 will detect that the viewing angle switching signal HVA is at high level, and the current setting in the narrow viewing angle mode is configured to each feedback node (FB), that is, the plurality of LEDs 31 are configured with an inverted V-shaped distributed current, so that in the narrow viewing angle mode, the luminous brightness of the plurality of LEDs 31 gradually decreases from the middle to both sides of the display panel 10, so as to achieve a narrow viewing angle display effect.

In addition, when switching to the narrow viewing angle mode, the timing controller 40 will also detect that the viewing angle switching signal HVA is at high level. At this time, the timing controller 40 may also start the HDR (high dynamic range) algorithm to process the data signals in order to adjust the data signals output to each pixel unit 17 on the display panel 10, so that the pixel brightness of the display panel 10 also gradually decreases from the middle to both sides of the display panel 10, that is, the pixel brightness is also in an inverted V-shaped distribution, to further enhance the anti-peeping effect in the narrow viewing angle mode.

When switching to the wide viewing angle mode, the LED driver module 60 will detect that the viewing angle switching signal HVA is at low level, and the current setting in the wide viewing angle mode is configured to each feedback node (FB), that is, the plurality of LEDs 31 are configured with a V-shaped distributed current, so that in the wide viewing angle mode, the luminous brightness of the plurality of LEDs 31 gradually increases from the middle to both sides of the display panel 10, so as to achieve a wide viewing angle display effect.

In addition, when switching to the wide viewing angle mode, the timing controller 40 will also detect that the viewing angle switching signal HVA is at low level. At this time, the timing controller 40 may also start the HDR (high dynamic range) algorithm to process the data signals in order to adjust the data signals output to each pixel unit 17 on the display panel 10, so that the pixel brightness of the display panel 10 also gradually increases from the middle to both sides of the display panel 10, that is, the pixel brightness is also in a V-shaped distribution, to further enhance the display effect in the wide viewing angle mode.

Referring to FIG. 1, in order to adjust the overall brightness ratio of the backlight source 30 in different modes, the system end 80 may send a PWM (pulse-width modulation)

signal to the LED driver module 60, using different duty cycles of the PWM signal to adjust the overall brightness ratio of the backlight source 30. For example, the duty cycle of the PWM signal in the narrow viewing angle mode is set to be smaller than the duty cycle of the PWM signal in the wide viewing angle mode, so that the overall brightness of the backlight source 30 in the narrow viewing angle mode is lower than the overall brightness of the backlight source 30 in the wide viewing angle mode. In the narrow viewing angle mode or in the wide viewing angle mode, by further adjusting the LED currents for different zones on the light bar 32, the adjustment of the backlight brightness of the light bar 32 by zones can be achieved. When the duty cycle of the PWM signal is set to the maximum value, it is the highlight mode.

Specifically, the LED driver module 60 may be a processor including a microcontroller unit (MCU) or a field programmable gate array (FPGA). The LED driver module 60 can detect the level of the viewing angle switching signal HVA and the duty cycle of the PWM signal, and according to the level (high or low) of the viewing angle switching signal HVA, configure and output different currents for LEDs of different zones on the light bar 32, and according to the duty cycle of the PWM signal, adjust the overall brightness proportion of the light bar 32.

In summary, the display device provided in this embodiment can switch between a narrow viewing angle mode and a wide viewing angle mode. In the narrow viewing angle mode, the luminous brightness of the plurality of LEDs 31 is adjusted to gradually decrease from the middle to both sides of the display panel 10, to effectively improve the narrow viewing angle display effect in the X direction (i.e., the left-to-right direction), and avoiding the whitening phenomenon at large viewing angles. In the wide viewing angle mode, the luminous brightness of the plurality of LEDs 31 is adjusted to gradually increase from the middle to both sides of the display panel 10, to improve the situation that the luminous brightness of both sides of the concentrating backlight is low and improve the display effect in the wide viewing angle mode. Therefore, the display device can adopt different display modes according to different usage scenarios of the user, and ensure that the display in each mode achieves a better effect.

Second Embodiment

Figure 10:
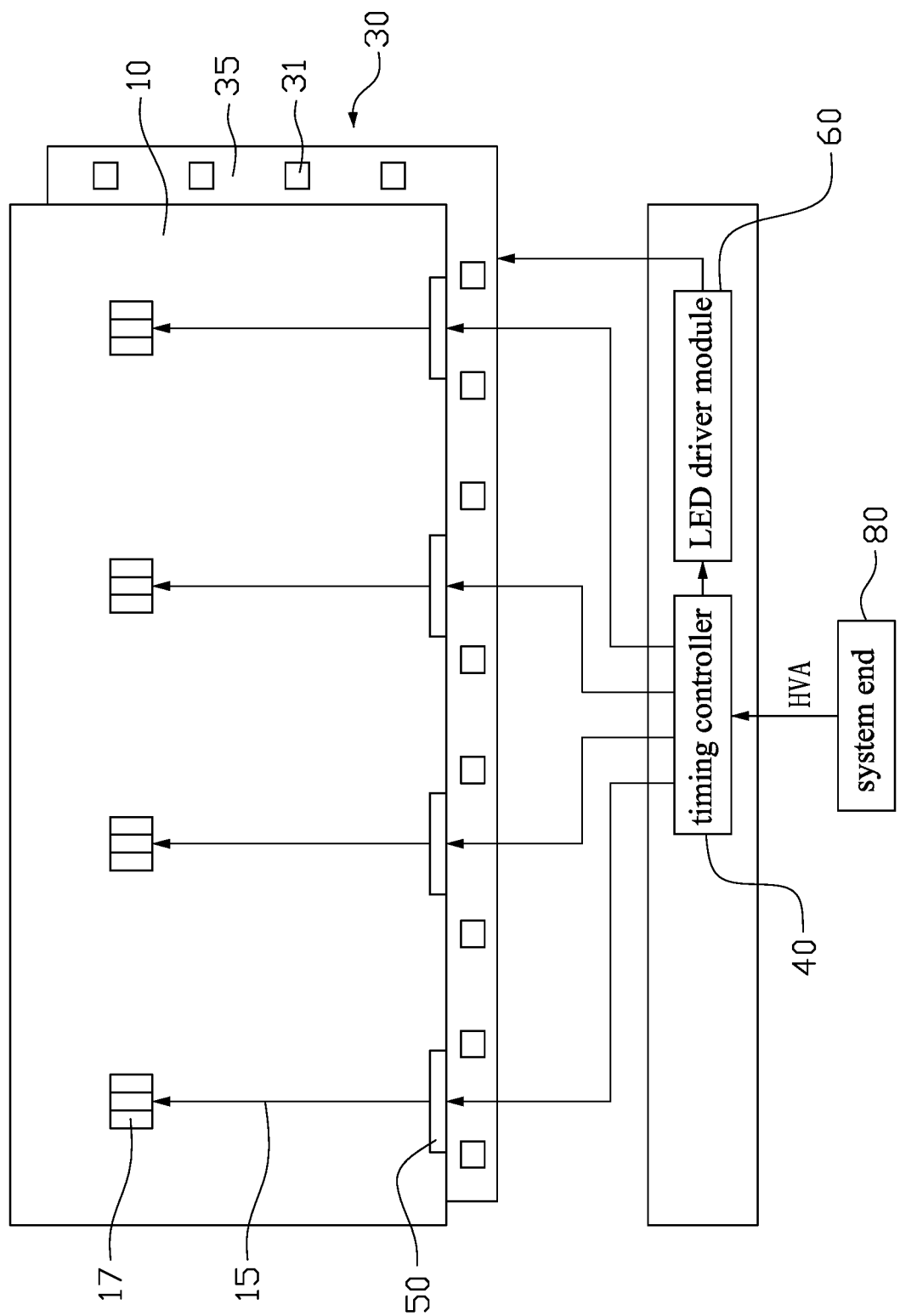
FIG. 10 is a schematic block diagram of a display device in a second embodiment of the present invention.

FIG. 10 is a schematic block diagram of a display device in a second embodiment of the present invention. Referring to FIG. 10, the display device provided in this embodiment includes a display panel 10, a backlight source 30, a timing controller 40, a source driver chip 50, and an LED driver module 60.

In this embodiment, the backlight source 30 is a direct type backlight structure. The backlight source 30 includes a plurality of LEDs 31 and a substrate 35. The substrate 35 is located under the display panel 10. The plurality of LEDs 31 are arranged on the substrate 35 in an array, i.e., the plurality of LEDs 31 are distributed in multiple rows and multiple columns on the substrate 35.

The display panel 10 can switch between a narrow viewing angle mode and a wide viewing angle mode. Under normal circumstances, the display panel 10 may be in the wide viewing angle mode. In an occasion requiring anti-peeping, the display panel 10 may be switched to the narrow viewing angle mode in order to protect personal privacy.

Figure 11:
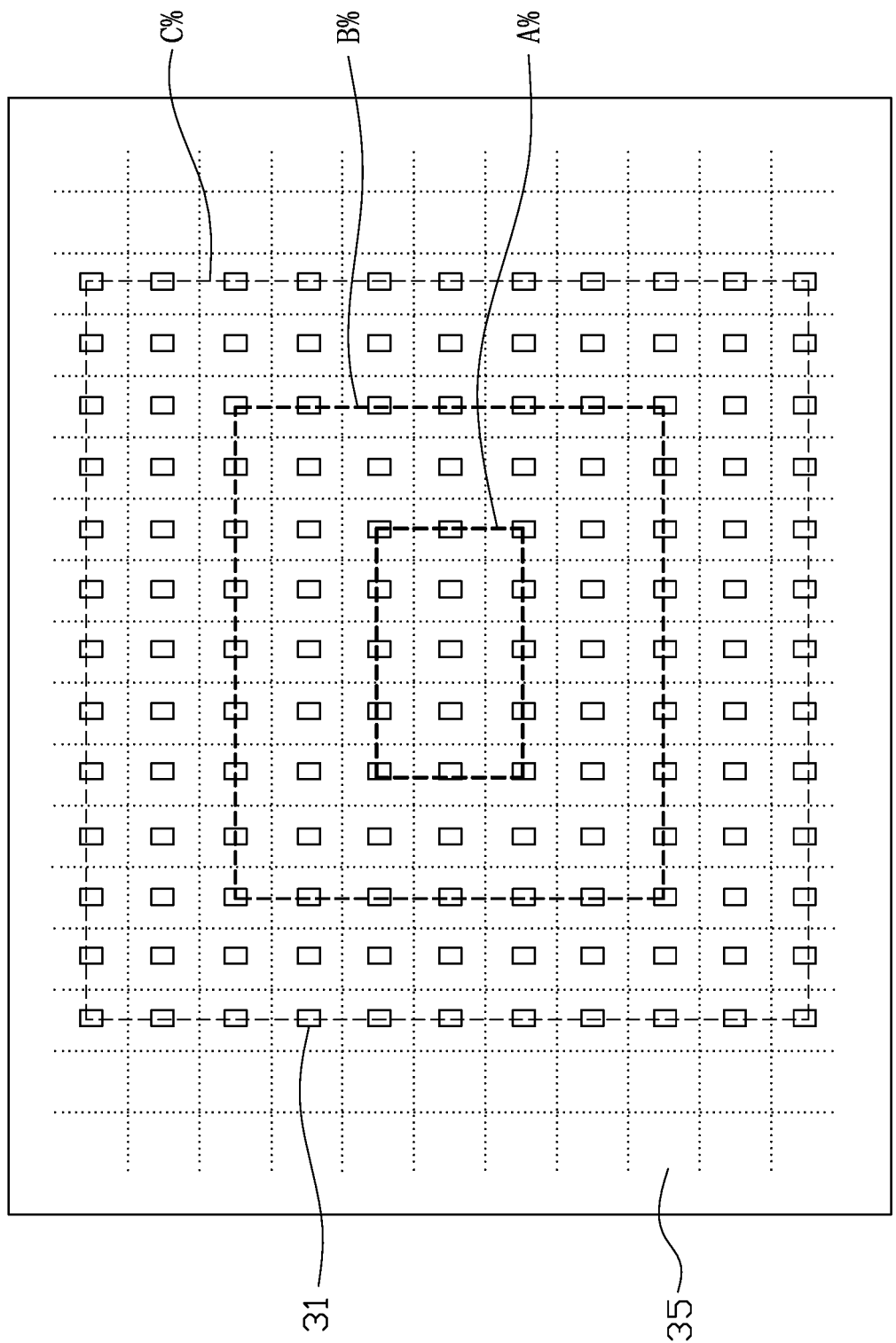
FIG. 11 is a schematic diagram of a brightness distribution of the LED array of the backlight source of FIG. 10 in the narrow viewing angle mode.
Figure 12:
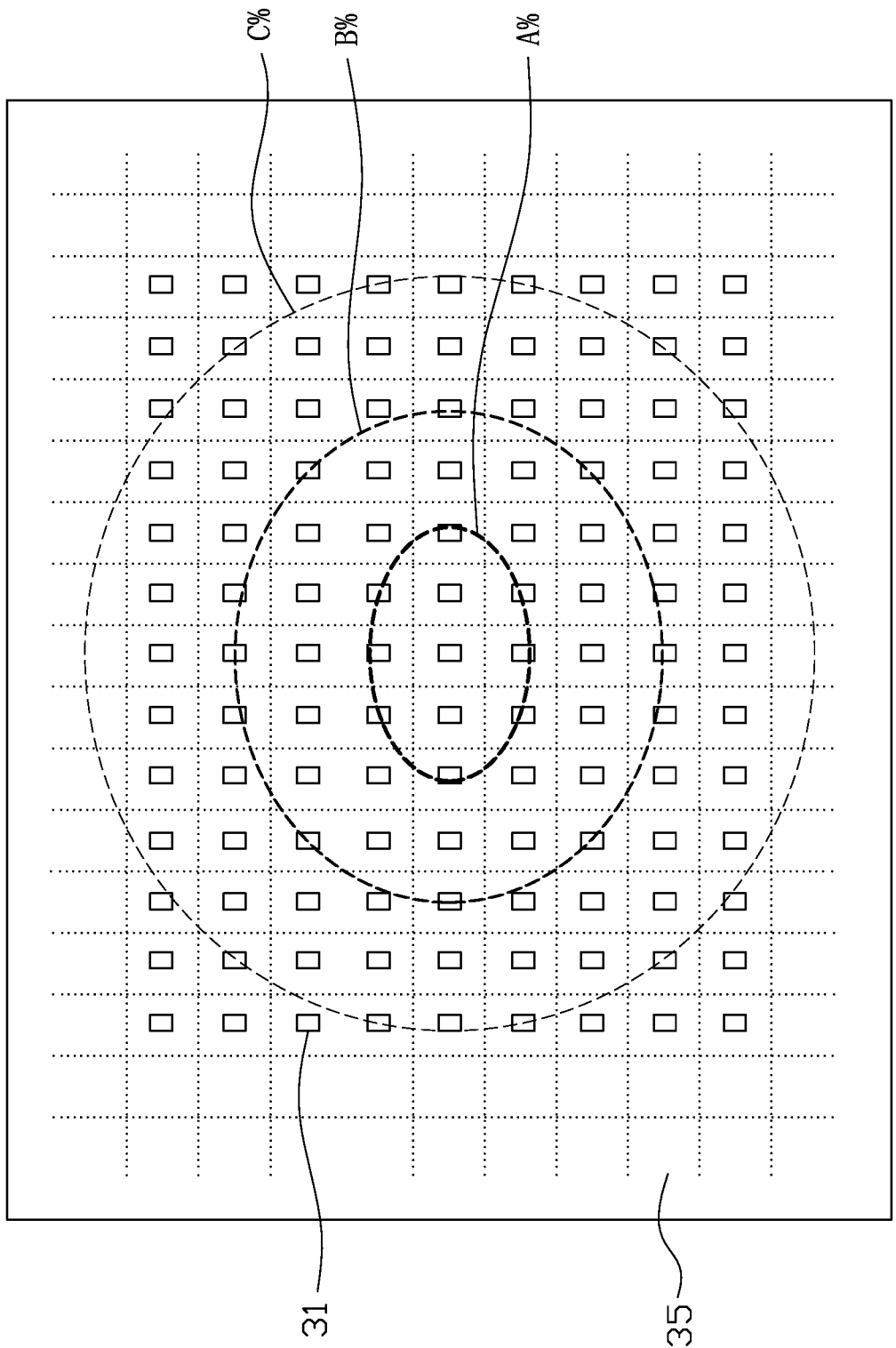
FIG. 12 is another schematic view of a brightness distribution of the LED array of the backlight source of FIG. 10 in the narrow viewing angle mode.

FIG. 11 is a schematic diagram of a brightness distribution of the LED array of the backlight source 30 of FIG. 10 in the narrow viewing angle mode, and FIG. 12 is another schematic view of a brightness distribution of the LED array of the backlight source 30 of FIG. 10 in the narrow viewing angle mode. Referring to the FIGS. 11 and 12, in the narrow viewing angle mode, the luminous brightness of the plurality of LEDs 31 is adjusted to gradually decrease from the center of the display panel 10 to the periphery (i.e., the middle is bright and the periphery is dark), which is similar to the contour distribution. The backlight brightness around the display panel 10 is reduced, and the brightness is low when the viewing angle is greater than 45°, so that the display panel 10 can achieve a narrow viewing angle display effect in both X and Y directions, thereby achieving a full range of anti-peeping effect.

In this embodiment, the plurality of LEDs 31 are divided into a plurality of zones on the substrate 35 to realize control by zones. Specifically, the plurality of LEDs 31 are divided into n zones arranged annularly and concentrically on the substrate 35, wherein n is an integer greater than 1. The shape of each zone may be rectangular (FIG. 11), circular or elliptical (FIG. 12). The LEDs 31 in each zone can be connected to one feedback node (FB), so that the LED array composed of the plurality of LEDs 31 can be independently controlled by zones, so that in the narrow viewing angle mode, the luminous brightness of the plurality of LEDs 31 gradually decreases from the center to the periphery. For example, in FIGS. 11 and 12, it is shown that in the narrow viewing angle mode, the luminous brightness of the plurality of LEDs 31 gradually decreases from A % brightness in the center to C % brightness in the periphery, and the luminous brightness in different zones is: A %>B %>C %.

Figure 13:
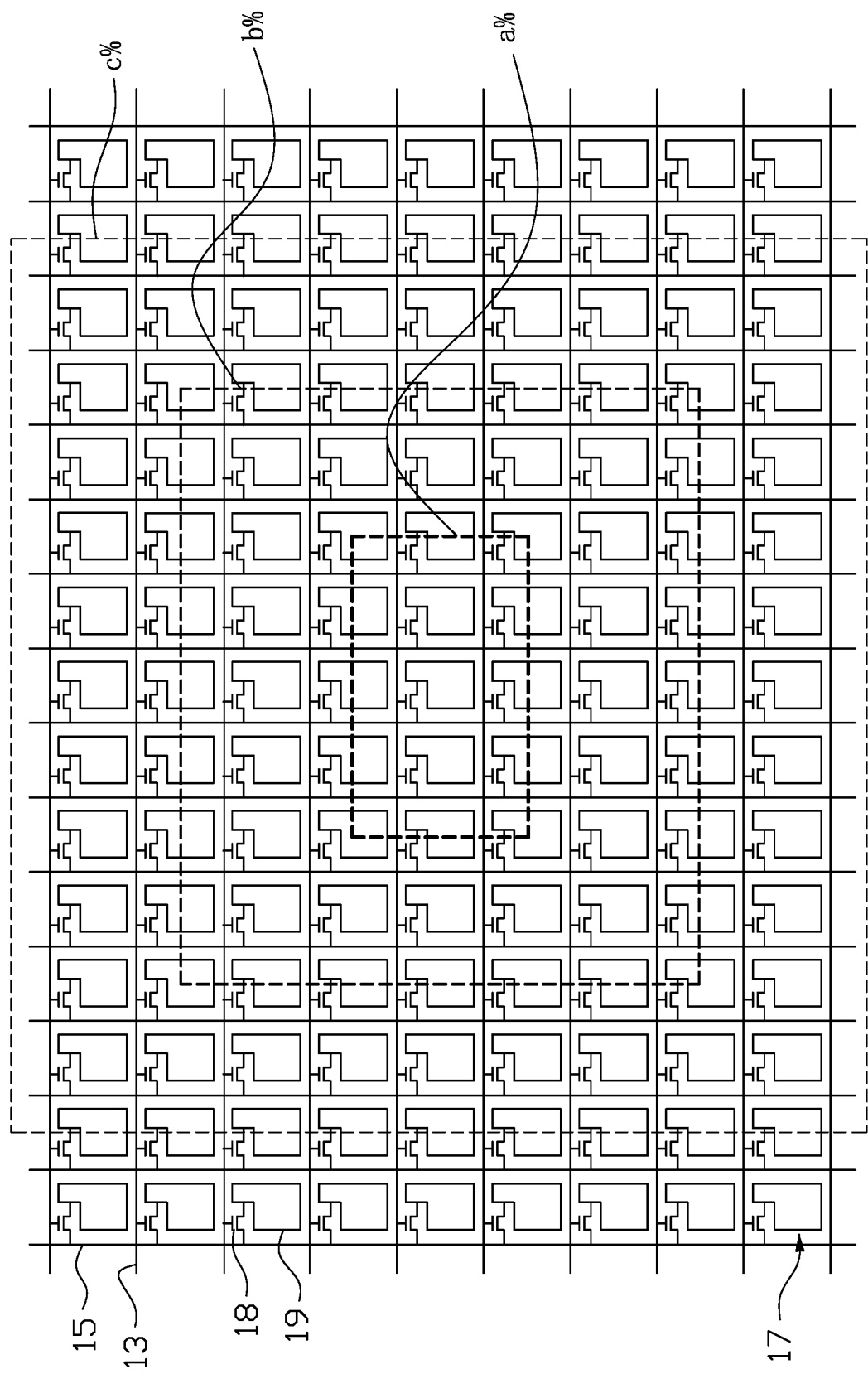
FIG. 13 is a schematic diagram of a brightness distribution of the pixels of the display panel of FIG. 10 in the narrow viewing angle mode.
Figure 14:
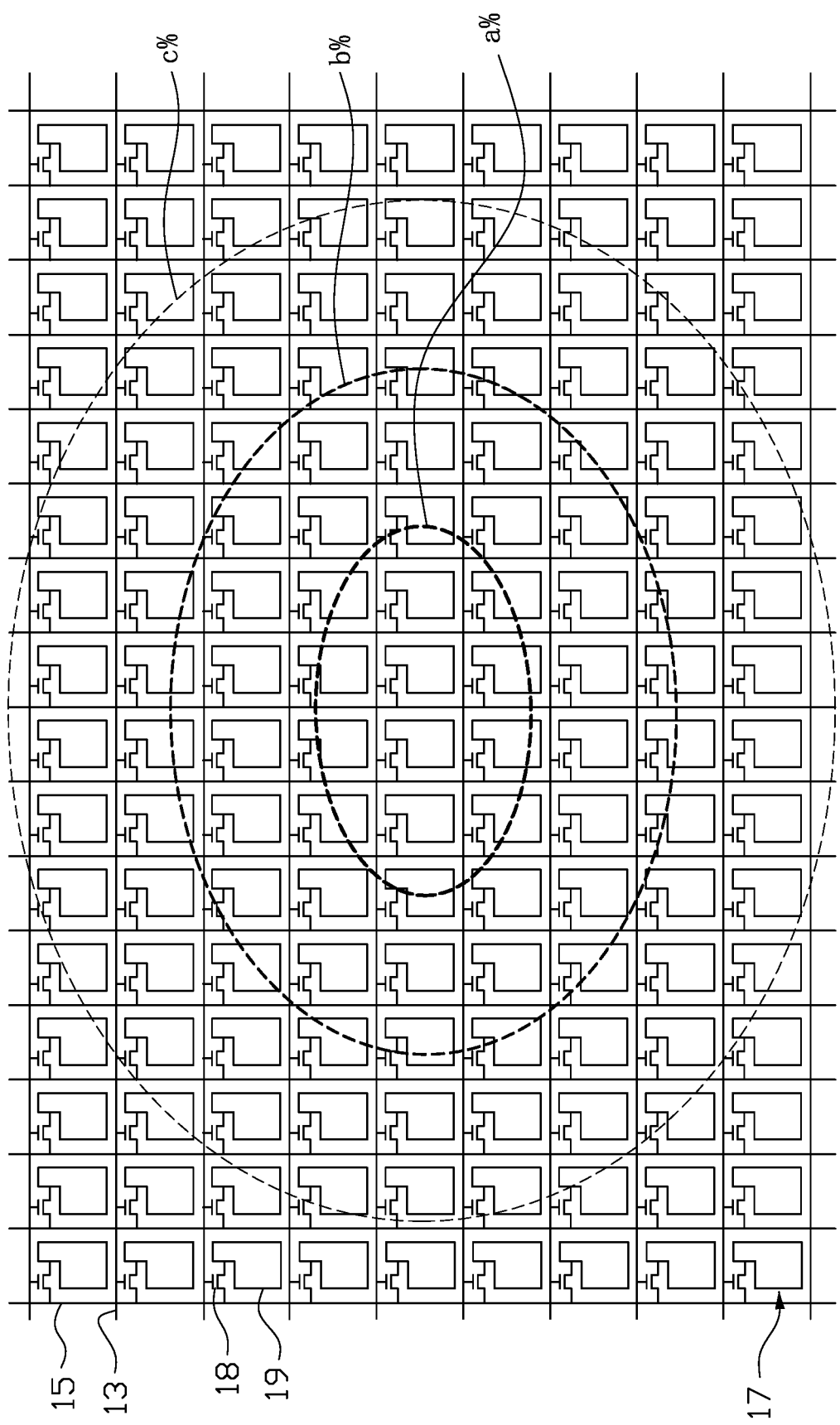
FIG. 14 is a schematic diagram of another brightness distribution of the pixels of the display panel of FIG. 10 in the narrow viewing angle mode.

FIG. 13 is a schematic diagram of a brightness distribution of the pixels of the display panel of FIG. 10 in the narrow viewing angle mode, and FIG. 14 is a schematic diagram of another brightness distribution of the pixels of the display panel of FIG. 10 in the narrow viewing angle mode. Referring to FIGS. 13 and 14, further, in the narrow viewing angle mode, the pixel brightness of the display panel 10 is also adjusted to gradually decrease from the center of the display panel 10 to the periphery (i.e., the middle is bright and the periphery is dark). That is, if each pixel unit 17 on the display panel 10 displays the same gray level, the brightness of pixels around the display panel 10 is less than the brightness of pixels at the center of the display panel 10, so that in the narrow viewing angle mode, the luminous brightness of the plurality of LEDs 31 and the pixel brightness of the display panel 10 both decrease from the center of the display panel 10 to the periphery, to further improve the anti-peeping effect in the narrow viewing angle mode. FIGS. 13 and 14 illustrate that in the narrow viewing angle mode, the pixel brightness of the display panel 10 is gradually reduced from a % brightness in the center to c % brightness in the periphery, and the brightness of pixels in different areas of the display panel 10 is: a %>b %>c %. Correspondingly, the areas of the display panel 10 with different pixel brightness may also be rectangular (FIG. 13), circular or elliptical (FIG. 14).

In this embodiment, the backlight source 30 has a direct type structure, and the backlight emitted by the LED array composed of the plurality of LEDs 31 appears as a surface light source. Therefore, in the wide viewing angle mode, the luminous brightness of the plurality of LEDs 31 can maintain their original brightness without adjustment. For example, the plurality of LEDs 31 can have the same luminous brightness from the center to the periphery of the display panel 10 to achieve normal wide viewing angle display.

Moreover, in this embodiment, in the wide viewing angle mode, there is no need to activate the HDR algorithm to process the data signals, and the pixel brightness of the display panel 10 may be uniform across the entire surface. That is, if each pixel unit 17 on the display panel 10 displays the same gray scale, the pixel brightness in the periphery of the display panel 10 and the pixel brightness in the center of the display panel 10 may be the same.

Figure 15:
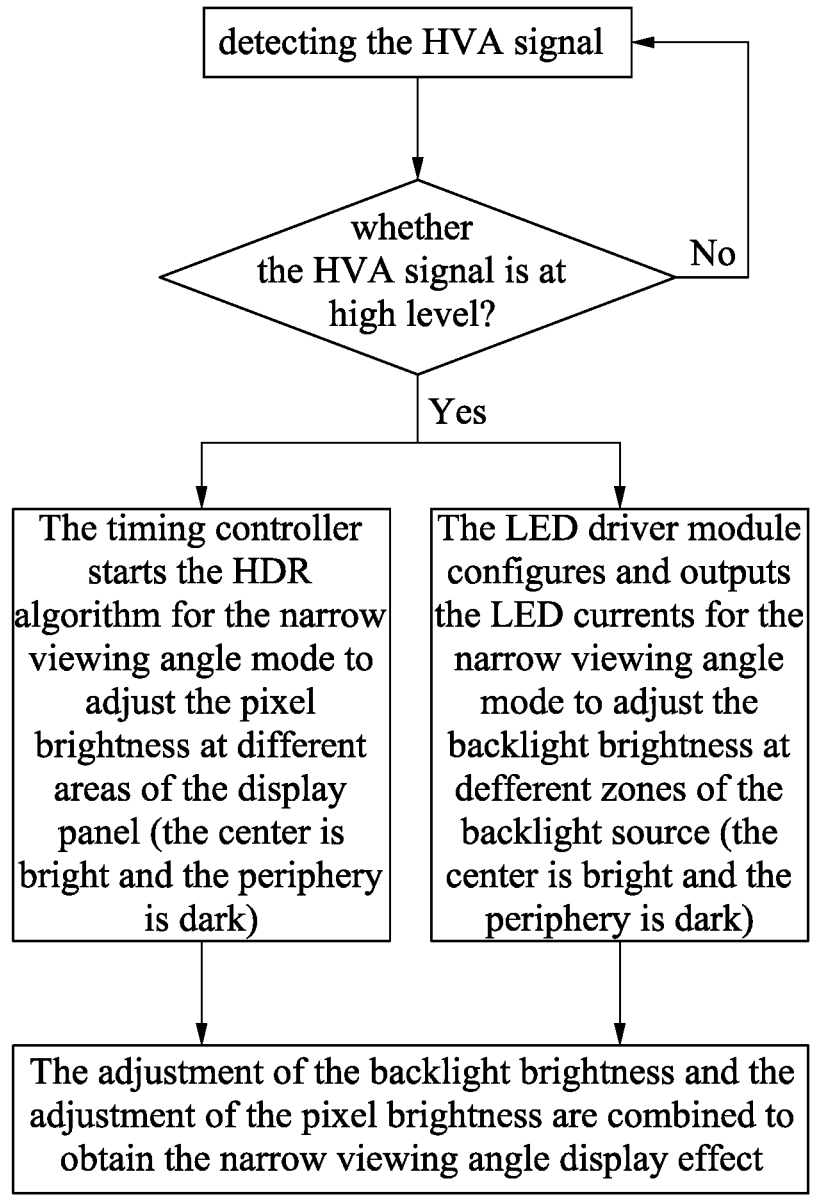
FIG. 15 is a driving flowchart of the display device of FIG. 10.

FIG. 15 is a driving flowchart of the display device of FIG. 10. Referring to FIGS. 10 and 15, the driving method of this embodiment differs from the first embodiment described above in that when the display panel 10 is switched to the narrow viewing angle mode, the LED driver module 60 controls the currents applied to different zones in the LED array, so that the luminous brightness of the plurality of LEDs 31 gradually decreases from the center to the periphery of the display panel 10, so as to achieve a full-range narrow viewing angle display effect.

In addition, in the narrow viewing angle mode, the timing controller 40 may also start the HDR algorithm to process the data signals in order to adjust the data signals output to each pixel unit 17 on the display panel 10, so that the pixel brightness of the display panel 10 also gradually decreases from the center of the display panel 10 toward the periphery, to further enhance the anti-peeping effect in the narrow viewing angle mode.

When the display panel 10 is switched to the wide viewing angle mode, the luminous brightness of the plurality of LEDs 31 and the pixel brightness of the display panel 10 can be maintained the same as original, that is, no adjustment is made.

For other structures of this embodiment, reference may also be made to the foregoing first embodiment, and details are not described herein again.

In summary, the display device provided in this embodiment can switch between a narrow viewing angle mode and a wide viewing angle mode. In the narrow viewing angle mode, the luminous brightness of the plurality of LEDs 31 is adjusted to gradually decrease from the center of the display panel 10 to the periphery, effectively improving the narrow viewing angle display effect in the X and Y directions, achieving a full range of anti-peeping effect, and avoiding the whitening phenomenon under large viewing angles.

Figure 16A:
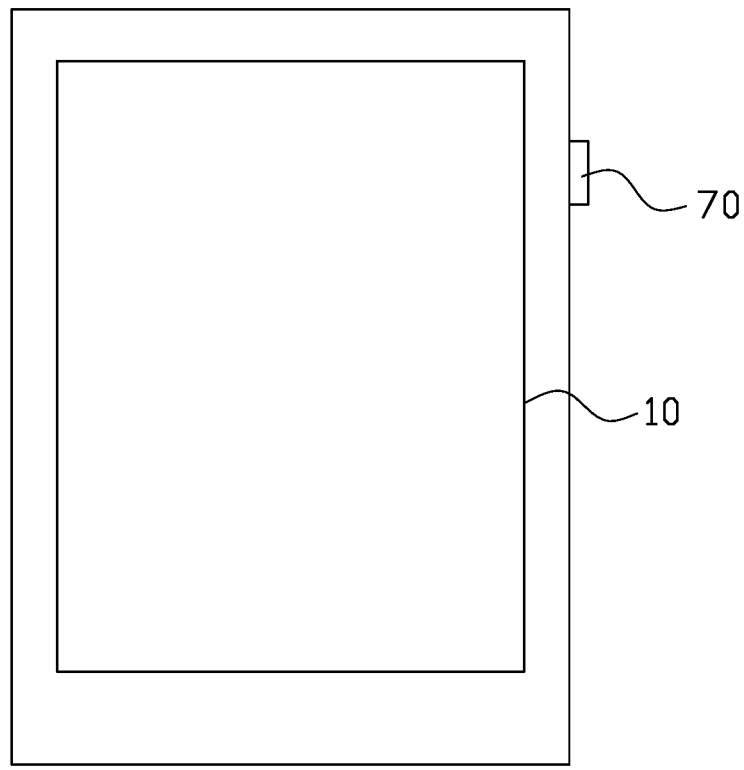
FIG. 16a and FIG. 16b are schematic plan views of the display device of FIG. 1 or FIG. 10.
Figure 16B:
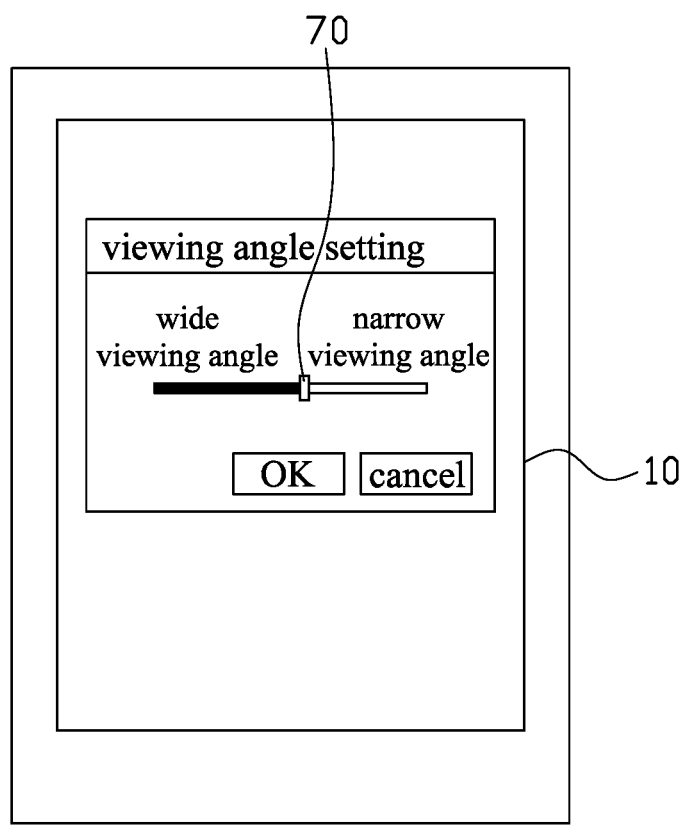

In addition, referring to FIGS. 16a and 16b, the display device further includes a viewing angle switching button 70 for user operation to generate a viewing angle switching signal HVA. The viewing angle switching button 70 may be a physical button (FIG. 16a) or a virtual button (FIG. 16b). The viewing angle switching signal HVA sent by the user by operating the viewing angle switching button 70 can be received by the system end 80 and transmitted to the timing controller 40 and the LED driver module 60. The timing controller 40 and the LED driver module 60 can determine the corresponding display mode according to the level of the viewing angle switching signal HVA. For example, when the viewing angle switching signal HVA is at low level, the display panel 10 is controlled to switch to a wide viewing angle mode; when the viewing angle switching signal HVA is at high level, the display panel 10 is controlled to switch to a narrow viewing angle mode.

The above are only the preferred embodiments of the present invention and are not intended to limit the present invention. Any modification, equivalent replacements, improvements, etc. within the principle of the present invention should be included in the protection scope of the present invention.

What is claimed is:

1. A display device with switchable viewing angles comprising a display panel, a backlight source, a timing controller, a source driver chip and an LED (light-emitting diode) driver module, the display panel being provided with a plurality of scanning lines and a plurality of data lines, the plurality of scanning lines and the plurality of data lines being insulated and intersected with each other to define a plurality of pixel units arranged in an array, the backlight source comprising a plurality of LEDs, the timing controller being connected to the source driver chip, the source driver chip being connected to the plurality of data lines, the LED driver module being connected to the plurality of LEDs, wherein the display panel has a narrow viewing angle mode and a wide viewing angle mode; in the narrow viewing angle mode, a luminous brightness of the plurality of LEDs is adjusted to gradually decrease from a middle to both sides of the display panel; in the wide viewing angle mode, the luminous brightness of the plurality of LEDs is adjusted to gradually increase from the middle to both sides of the display panel; wherein a minimum luminous brightness of the plurality of LEDs in the wide viewing angle mode is greater than or equal to a maximum luminous brightness of the plurality of LEDs in the narrow viewing angle mode.

2. The display device with switchable viewing angles according to claim 1, wherein in the narrow viewing angle mode, a pixel brightness of the display panel is also adjusted to gradually decrease from the middle to both sides of the display panel; in the wide viewing angle mode, the pixel brightness of the display panel is also adjusted to gradually increase from the middle to both sides of the display panel.

3. The display device with switchable viewing angles according to claim 1, wherein in the narrow viewing angle mode, a brightness distribution of the plurality of LEDs is in an inverted V-shape or in a parabolic shape with an opening facing downward; in the wide viewing angle mode, the brightness distribution of the plurality of LEDs is in a V-shape or in a parabolic shape with the opening facing upward.

4. The display device with switchable viewing angles according to claim 1, wherein the backlight source further comprises a light bar and a light guide plate, the light guide plate is located under the display panel, the light bar is disposed adjacent to a side surface of the light guide plate, the plurality of LEDs are arranged on the light bar along an axial direction of the light bar, and the plurality of LEDs are divided into a plurality of zones in the axial direction of the light bar to realize control by zones.

5. The display device with switchable viewing angles according to claim 4, wherein the plurality of LEDs are divided into 2n zones arranged in order in the axial direction of the light bar, wherein n is an integer greater than 1, the $1^{st}$ zone is located at one end of the light bar, the $2n^{th}$ zone is located at another end of the light bar, and the rest zones are arranged in order between the $1^{st}$ zone and the $2n^{th}$ zone.

6. The display device with switchable viewing angles according to claim 5, wherein in the 2n zones, the $x^{th}$ zone and the $(2n-x+1)^{th}$ zone are connected in series and connected to a same feedback node, wherein x is an integer greater than or equal to 1 and less than n.

7. The display device with switchable viewing angles according to claim 4, wherein the light bar is located at a bottom or a top of the display panel.

8. The display device with switchable viewing angles according to claim 1, wherein the display panel further has a highlight display mode, and in the highlight display mode, the luminous brightness of the plurality of LEDs is uniform from the middle to both sides of the display panel, and the luminous brightness of the plurality of LEDs in the highlight display mode is greater than or equal to the maximum luminous brightness of the plurality of LEDs in the wide viewing angle mode.

9. The display device with switchable viewing angles according to claim 1, wherein the display device further comprises a viewing angle switching button for user operation to generate a viewing angle switching signal, the viewing angle switching signal is transmitted to the timing controller and the LED driver module.

* * * * *